INVENTOR.
Richard S. Ploss
BY
Morse, Altman & Oates
ATTORNEYS

United States Patent Office — 3,551,028
Patented Dec. 29, 1970

3,551,028
ELECTRO-OPTICAL LIGHT MODULATOR—LOW VOLTAGE
Richard S. Ploss, Danvers, Mass., assignor to Baird-Atomic, Inc., Cambridge, Mass., a corporation of Massachusetts
Filed July 6, 1967, Ser. No. 651,562
Int. Cl. G02f 1/28
U.S. Cl. 350—160                              4 Claims

ABSTRACT OF THE DISCLOSURE

An electro-optic valve is formed from an electro-optic crystal, opposite faces of which are reflectorized to establish a folded path between an entrance window and an exit window. By virtue of the relatively large number of times the beam of light passes through the crystal material, a relatively small control signal across the crystal is capable of effecting modulation of large amplitude.

BACKGROUND AND SUMMARY OF DISCLOSURE

The present invention relates to electro-optic light modulators and, more particularly, to a light valve characterized by a crystalline medium through which light can be directed from an entrance window to an exit window, and a pair of control electrodes by which the transmittance of the medium with respect to the light may be varied, preferably between a point approximating 0% to a point approximating 100%. In the past, typical voltages applied between the control electrodes in order to modulate transmitted light have been unduly high because of unit propagation through the crystal.

The object of the present invention is to increase the effective number of passes of light within an electro-optic medium and, therefor, to reduce the amplitude of the modulation needed for a given change in effective transmittance by providing a path, at least portions of which are reflectorized, so that the light is propagated in a zig-zag route on its way from an entrance window through an exit window. The axis of propagation of light is oriented at a slight angle with respect to the parallel faces of the medium in order to establish the zig-zag route. Crossed polarizers are placed at the entrance and exit windows so that the device normally is nontransmitting. When an appropriate voltage is applied across the medium, the polarization axis within the medium is rotated so as to enable transmission to a greater or lesser degree.

Other objects of the present invention will in part be obvious and will in part appear hereinafter.

BRIEF DESCRIPTION OF DRAWING

For a fuller understanding of the nature and objects of the present invention reference should be had to the following detailed description taken in connection with the accompanying drawing wherein.

DETAILED DESCRIPTION OF THE PREFERRED EMBODIMENTS

Generally, each of the embodiments of the present invention disclosed herein is a system having a source of light, preferably collimated, directed along an axis, an electro-optic medium having its optic axis at a slight angle with respect to the axis of the system, a pair of crossed polarizers between which the electro-optic modulator is positioned, a pair of electrodes in contiguity with opposite faces of the medium, and a control circuit for applying a signal to the electrodes. Preferred materials for the electro-optic medium are uniaxial crystals such as potassium dihydrogen phosphate and isomorphic deuterated potassium dihydrogen phosphate, trigonal crystals such as lithium niobate and isometric crystals such as cuprous chloride. Preferably the electro-optic plate ranges in thickness between 0.002 inch and 1 inch. Certain of these materials, all of which exhibit pockels effect, are described in U.S. Pat. No. 2,463,109, issued Mar. 1, 1949 and 2,616,962, issued Nov. 4, 1962, both in the name of Hans Jaffe.

The illustrated polarizing material are of any of a variety of types for example, dichroic polarizers characterized by two polarized beams one of which is isolated from the other by absorption, birefringement polarizers characterized by two polarized beams one of which is isolated from the other by refraction and crystal polarizers characterized by two polarized beams one of which is isolated from the other by a "pile of plates" interface. At various locations on opposite faces or the same face of the medium are entrance and exit windows and opposed metallized areas that serve both as reflectors for light transmitted through the medium and as electrodes for electrical signals applied across the medium. This system is adapted for incorporation in any apparatus in which it is desired to vary the intensity of light as a function of a particular input phenomenon.

Figure 1:
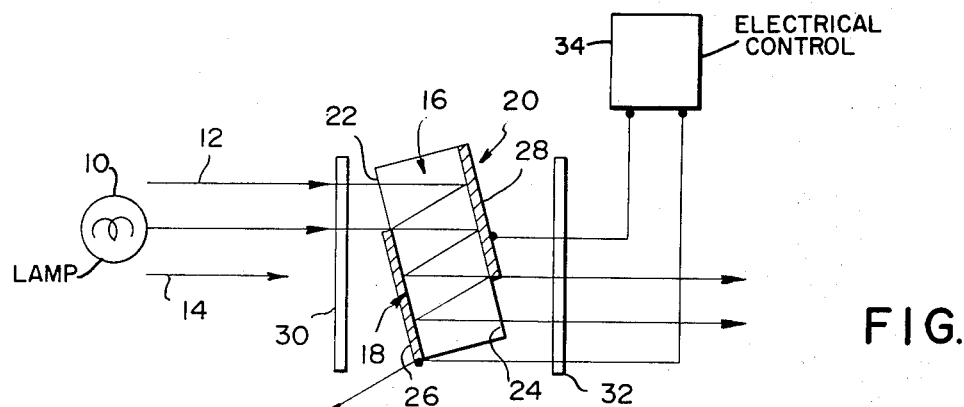
FIG. 1 is a cross sectional view of an exemplary electro-optic light modulator embodying the present invention.

Referring now to FIG. 1, there is shown a system comprising a light source as at 10, a collimating lens system as at 12 establishing a system axis 14. Oriented at a slight angle, say from 1 to 30°, with respect to a plane normal to the system axis, is an electro-optic crystal in the form of a plate 16 having a forward face 18 and a rearward face 20. The upper area of face 18 and the lower area of face 20 are transparent in order to provide an entrance window 22 and an exit window 24. The lower area of face 18 and the upper area of face 20 are coated with aluminum or silver electrodes 26, 28, which are highly reflecting and electrically conducting. It will be apparent that parallel rays of light entering window 22 along system axis 14 will be reflected between metallized areas 26 and 28 several times until finally being emitted through exit window 24. At opposite faces 18, 20 and disposed perpendicularly with respect to the incident parallel rays of light are a pair of parallel sheet polarizers 30, 32. It will be apparent that when a potential is applied as at 34 across electrodes 26, 28, the degree of rotation of the polarization axis of the light varies directly with the number of passes of the light between the two electrodes through the medium. This degree of rotation determines the magnitude of the vector component transmitted through polarizer (analyzer) 32 and therefore the modulated transmittance of the system.

Figure 2:
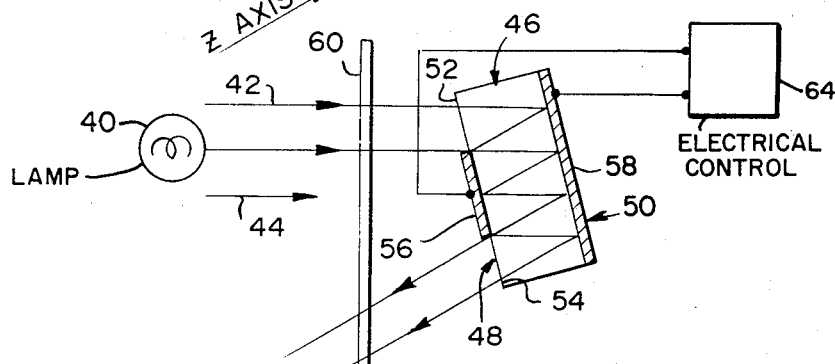
FIG. 2 is an exaggerated cross sectional view of an alternative electro-optic light modulator embodying the present invention.

Referring now to FIG. 2, there is shown a system comprising a light source as at 40, a collimating lens system as at 42 establishing a system axis 44. Oriented at a slight angle, say from 1 to 30°, with respect to a plane normal to the entrance axis, is an electro-optic crystal in the form of a plate 46 having a forward face 48 and a rearward face 50. The upper and lower areas of face 48 are transparent in order to provide an entrance window 52 and an exit window 54. The medial area of face 48 and all of face 50 are coated with aluminum or silver electrodes 56, 58, which are highly reflecting and conducting. It will be apparent that parallel rays of light entering window 52 along system axis 44 will be reflected between electrodes 56, 58 several times until finally being emitted through exit window 54. At opposite faces 48, 50 and disposed perpendicularly with respect to the incident parallel rays of light is a sheet polarizer 60. It will be apparent that when a potential is applied as at 64 to electrodes 56, 58, rotation of the polarization axis occurs within the medium and modulation occurs as in FIG. 1 with an amplitude that varies directly with the number of passes of the light between the electrodes through the medium.

Figure 3:
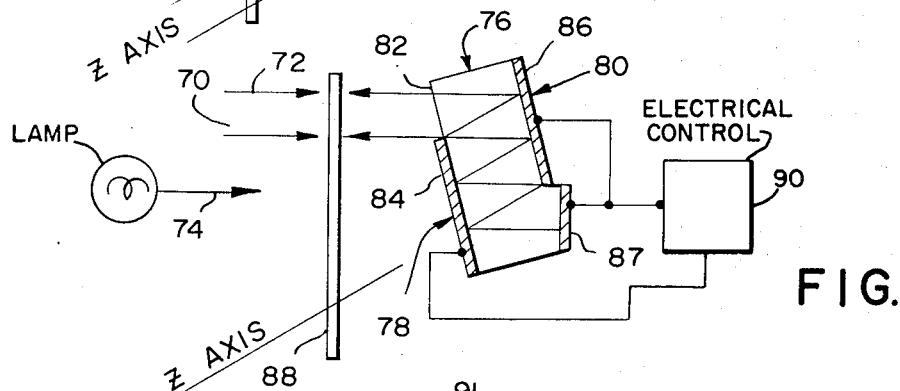
FIG. 3 is an exaggerated cross sectional view of a further electro-optic modulator embodying the present invention.

Referring now to FIG. 3, there is shown a system comprising a light source as at 70, a colliminating lens system as at 72 establishing a system axis 74. Oriented at a slight angle, say from 1 to 30° with respect to a plane normal to the entrance axis, is an electro-optic crystal in the form of a plate 76 having a forward face 78 and a rearward face 80. The upper area of face 78 is transparent in order to provide a combined entrance and exit window 82. The remaining area of face 78 and the opposing parallel area of face 80 are coated with aluminum or silver electrodes 84, 86, which are highly reflecting and conducting. It will be apparent that parallel rays of light entering window 82 along entrance axis 74 will be reflected between electrodes 78, 80 several times until finally reaching the lower extremity of face 86. Beyond this lower extremity is a return reflector 87 which is disposed at a slight angle, say between 1 and 30° with respect to the remainder of face 80. It is apparent that parallel rays previously reflected between electrodes 84, 86 strike mirror 87 and are returned via the same path between electrodes 84, 86 and through window 82. At window 82 is a polarizer 88. It will be apparent that under ordinary circumstances, a beam of incident light along axis 74 is polarized in one orientation by polarizer 70 and may be returned in the same orientation for transmission through the polarizer as if operating as in FIG. 1 or FIG. 2 with parallel polarizers. However when an appropriate low voltage is applied by a control means 90, the orientation of the polarized beam is slightly rotated in such a way that the emergent beam is at least to some extent blocked by polarizer 88. Accordingly, modulation occurs as in FIG. 1 with an amplitude that varies directly with the number of passes through the medium.

Figure 4:
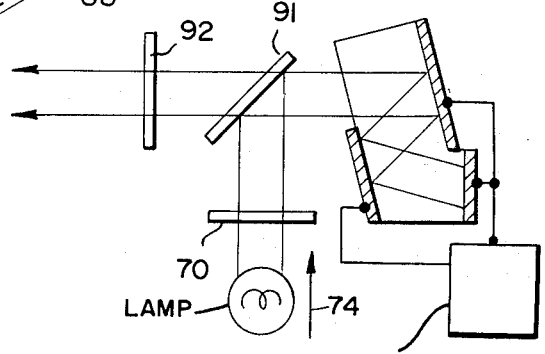
FIG. 4 is a modification of the modulator of FIG. 3.

Alternatively, in FIG. 4, an off axis collimated, polarized light source may be used to direct light to a beam splitter 91 that is interposed angularly between polarizer 88 and window 82. The purpose of the foregoing is to optimize the polarization from the source and to reflect it into window 82 in parallelism with the system axis 74. A second polarizer 92 analyzes the light reflected from crystal 76 through beam splitter 91.

CONCLUSION

The present invention thus provides an extremely low voltage pockels effect light modulator in which voltage can be reduced as desired to an efficacious low level for a variety of purposes. Since certain changes may be made in the above described embodiment of the present invention without departing from the scope of the invention herein involved, it is intended that all matter contained in the above description and shown in the accompanying drawing be interpreted in an illustrative and not in a limiting sense.

What is claimed is:

1. An electro-optic light modulator comprising a source for producing a collimated light beam, an electro-optic medium in the form of a pockels effect plate oriented at an oblique angle with respect to the axis of said light beam, said plate having a pair of opposed faces, said faces providing transparent window means, electrode means on said pair of opposed faces providing electrically conducting and light reflecting areas, the optical axis of said pockels effect plate intersecting said pair of opposed faces and being oblique with respect to said beam axis, said window means and said conducting and reflecting areas being such that entrance of said light beam through said window means results in transmission of said light in a zig-zag path involving reflection between said conducting and reflecting areas and emission of said light thereafter through said window means, polarizing sheet means optically associated with said window means for polarizing the light beam entering and analyzing the light beam exiting said medium, and electrical means for applying a signal between said conducting and reflecting means and across said plate between said pair of faces in order to modulate the polarization of the light transmitted through said plate.

2. An electro-optic light modulator comprising a source for producing a collimated light beam, a pockels effect electro-optic medium in the form of a plate oriented at an oblique angle with respect to the axis of said light beam, said plate having a pair of opposed faces, said faces providing transparent window means, opaque metallic electrode coatings on said faces providing electrically conducting and light reflecting areas, the optical axis of said pockels effect plate intersecting said pair of opposed faces and being oblique with respect to said beam axis, said window means and said conducting and reflecting areas being such that entrance of said light through said window means results in transmission of said light in a zig zag path involving reflection between said conducting and reflecting areas and emission of said light thereafter through said window means, polarizing sheet means optically associated with said window means for polarizing the light beam entering and analyzing the light beam exiting said medium, and electrical means for applying a signal between said conducting and reflecting means and across said plate between said pair of faces in order to modulate the polarization of the light transmitted through said plate, said window means including windows at opposite faces and opposite ends of said plate.

3. An electro-optic modulator comprising a source for producing a collimated light beam, a pockels effect electro-optic medium in the form of a plate oriented at an angle with respect to the axis of said light, said plate having a pair of opposed faces, said faces providing transparent window means, opaque metallic electrode coatings on said faces providing electrically conducting and light reflecting areas, the optical axis of said plate intersecting said pair of opposed faces and being oblique with respect to said beam axis, said window means and said electrically conducting and light reflecting areas being such that entrance of said light through said window means results in transmission of said light in a zig zag path involving reflection between said electrically conducting and light reflecting areas and emission of said light thereafter through said window means, polarizing sheet means optically associated with said window means for polarizing the light beam entering and analyzing the light beam exiting said medium, the electrical means for applying a signal between said conducting and reflecting means and across said plate between said pair of faces in order to modulate the polarization of the light transmitted through said plate, said window means including windows at the same face and opposite ends of said plate.

4. An electro-optic light modulator comprising a source for producing a collimated light beam, a pockels effect electro-optic medium in the form of a plate oriented at an angle with respect to the axis of said light beam, said plate having a pair of opposed faces, said faces providing transparent window means, opaque metallic electrode coatings on said faces providing electrically conducting and light reflecting areas, the optical of said plate intersecting said pair of opposed faces and being oblique with respect to said beam axis, said window means and said electrically conducting and light reflecting areas being such that entrance of said light beam through said window means results in transmission of said light in a zig zag path involving reflection between said electrically conducting and light reflecting areas and emission of said light thereafter through said window means, polarizing sheet means optically associated with said window means for polarizing the light beam entering and analyzing the light beam exiting said medium, and electrical means for applying a signal between said conducting and reflecting means and across said plate between said pair of faces in order to modulate the orientation of polarized light transmitted through said plate, said window means being a single window at one of said faces.

References Cited

UNITED STATES PATENTS

| 3,325,646 | 6/1967 | Reichel et al. | 250—199 |
| 3,242,805 | 3/1966 | Harrick | 350—160 |

RONALD L. WIBERT, Primary Examiner

P. K. GODWIN, Assistant Examiner

U.S. Cl. X.R.

350—150